United States Patent
Druke et al.

(10) Patent No.: US 8,054,752 B2
(45) Date of Patent: Nov. 8, 2011

(54) SYNCHRONOUS DATA COMMUNICATION

(75) Inventors: Michael B. Druke, Half Moon Bay, CA (US); Christopher J. Jacques, Mountain View, CA (US)

(73) Assignee: Intuitive Surgical Operations, Inc., Sunnyvale, CA (US)

(*) Notice: Subject to any disclaimer, the term of this patent is extended or adjusted under 35 U.S.C. 154(b) by 253 days.

(21) Appl. No.: 11/479,203

(22) Filed: Jun. 30, 2006

(65) Prior Publication Data

US 2007/0147385 A1   Jun. 28, 2007

Related U.S. Application Data

(60) Provisional application No. 60/853,991, filed on Dec. 22, 2005.

(51) Int. Cl.
   *G01R 31/08* (2006.01)
   *G05B 19/04* (2006.01)

(52) U.S. Cl. .......... 370/242; 700/247; 700/250

(58) Field of Classification Search .......... None
   See application file for complete search history.

(56) References Cited

U.S. PATENT DOCUMENTS

| | | | |
|---|---|---|---|
| 5,068,851 A * | 11/1991 | Bruckert et al. | 714/25 |
| 5,652,711 A | 7/1997 | Vennekins | |
| 5,762,458 A | 6/1998 | Wang et al. | |
| 6,021,129 A | 2/2000 | Martin et al. | |
| 6,035,228 A * | 3/2000 | Yanof et al. | 600/429 |
| 6,182,120 B1 | 1/2001 | Beaulieu et al. | |
| 6,198,971 B1 * | 3/2001 | Leysieffer | 607/55 |
| 6,424,625 B1 | 7/2002 | Larsson et al. | |
| 6,674,731 B1 * | 1/2004 | Bradshaw et al. | 370/316 |
| 6,728,599 B2 | 4/2004 | Wang et al. | |
| 6,760,337 B1 | 7/2004 | Snyder, II et al. | |
| 6,920,586 B1 * | 7/2005 | Moyer | 714/43 |
| 7,440,793 B2 * | 10/2008 | Chauhan et al. | 600/424 |
| 2002/0080719 A1 | 6/2002 | Parkvall et al. | |
| 2002/0181503 A1 * | 12/2002 | Montgomery, Jr. | 370/468 |
| 2003/0112758 A1 | 6/2003 | Pang et al. | |
| 2004/0008693 A1 | 1/2004 | Grove et al. | |
| 2004/0078116 A1 * | 4/2004 | Hashimoto et al. | 700/264 |
| 2004/0125825 A1 * | 7/2004 | Lym et al. | 370/519 |
| 2004/0196861 A1 * | 10/2004 | Rinchiuso et al. | 370/441 |
| 2005/0058134 A1 * | 3/2005 | Levi et al. | 370/389 |
| 2005/0132104 A1 | 6/2005 | Brown | |
| 2005/0154493 A1 * | 7/2005 | Wang et al. | 700/245 |

(Continued)

OTHER PUBLICATIONS

Vertut, Jean and Coeffet, Philippe Coiffet; "Robot Technology; vol. 3A Teleoperation and Robotics Evolution and Development"; 1986; Prentice-Hall, Inc; Englewood Cliffs, N.J.

(Continued)

*Primary Examiner* — Andrew Lai
*Assistant Examiner* — Jutai Kao (57) ABSTRACT

A data packet is provided that includes a synchronization field and an acknowledgement field indicative of an acknowledgement of receipt of a prior data packet. The data packet also includes a response field that includes information indicative of a system fault, a header field, and a sequence number field that includes a number assigned to the data packet. The data packet further includes a data field, an end of packet field, and an error-checking field. Methods and computer program products are provided that, in some implementations, include retransmitting packets if the acknowledgement field in a received data packet is a no acknowledgement (NAK) and/or placing a node into a safe state in response to a fault signal that is included in the received data packet.

16 Claims, 4 Drawing Sheets

U.S. PATENT DOCUMENTS

| | | | |
|---|---|---|---|
| 2005/0199728 A1* | 9/2005 | Schmidt et al. | 235/462.46 |
| 2005/0265341 A1* | 12/2005 | Benedyk et al. | 370/389 |
| 2007/0147250 A1 | 6/2007 | Druke et al. | |
| 2007/0150631 A1 | 6/2007 | Druke et al. | |
| 2007/0153811 A1 | 7/2007 | Venters et al. | |
| 2008/0022165 A1* | 1/2008 | McKim et al. | 714/712 |
| 2008/0159126 A1 | 7/2008 | Takagi et al. | |
| 2009/0012532 A1* | 1/2009 | Quaid et al. | 606/130 |
| 2009/0046735 A1* | 2/2009 | Regnier et al. | 370/412 |

OTHER PUBLICATIONS

U.S. Appl. No. 11/480,282 Final Office Action, mailed Jan. 7, 2009, 19 pages.
PCT/US06/62366 International Search Report dated Oct. 1, 2008, 5 pages.
PCT/US06/62366 Written Opinion of the International Search Authority mailed Oct. 1, 2008, 7 pages.
U.S. Appl. No. 11/479,160 Final Office Action mailed Oct. 14, 2008, 21 pages.
U.S. Appl. No. 11/479,160 Non-Final Office Action mailed Apr. 8, 2008, 11 pages.
U.S. Appl. No. 11/480,282 Non-Final Office Action mailed Jun. 23, 2008, 12 pages.
PCT/US06/62367 International Search Report mailed Jul. 1, 2008, 2 pages.
PCT/US06/62367 Written Opinion of the International Search Authority mailed Jul. 1, 2008, 8 pages.
PCT/US06/62372 International Search Report mailed May 8, 2008, 2 pages.
PCT/US06/62372 Written Opinion of the international Search Authority mailed May 8, 2008, 7 pages.
U.S. Appl. No. 11/479,160 Non-Final Office Action mailed Apr. 2, 2009, 27 pages.
U.S. Appl. No. 11/480,282 Non-Final Office Action mailed May 26, 2009, 17 pages.
U.S. Appl. No. 11/480,282 Final Office Action mailed Jan. 12, 2010, 14 pages.

* cited by examiner

SYNCHRONOUS DATA COMMUNICATION

CLAIM OF PRIORITY

This application claims the benefit of U.S. Provisional Patent Application Ser. No. 60/753,991, filed on Dec. 22, 2005, the entire contents of which are hereby incorporated by reference.

BACKGROUND

The present disclosure relates to information systems.

Certain applications have high bandwidth requirements and strict synchronization, latency, and reliability requirements for communications. Robot-assisted surgery, for example, requires a high bandwidth to transmit control and feedback signals in real time. The synchronization and latency requirements of such applications are strict, because ideally there should be as little lag as possible between the movements of a surgeon and the movements of the robot. In these applications the communications must be highly reliable, because a data transmission error could injure a patient.

One conventional communication system used in robot-assisted surgery uses several hundred paths (e.g., wires) to connect a surgeon's control console to robotic arms. The use of hundreds of paths, however, makes setup and maintenance of the system cumbersome and requires substantial room to route all of the paths.

Conventional communication standards provide acceptable performance in some areas but are lacking in others. The IEEE-1394 interface standard, for example, provides synchronous, serial, point-to-point communication. IEEE-1394 channels have a guaranteed bandwidth but only can provide synchronization to within approximately 125 microseconds. Such performance may not be sufficient for certain applications requiring tighter synchronization.

SUMMARY

In one aspect, a data packet is provided that includes a synchronization field and an acknowledgement field indicative of an acknowledgement of receipt of a prior data packet. The data packet also includes a response field that includes information indicative of a system fault, a header field, and a sequence number field that includes a number assigned to the data packet. The data packet further includes a data field, an end of packet field, and an error-checking field.

Particular implementations may include one or more of the following features. The synchronization field, the acknowledgement field, the response field, the header field, the sequence number field, and the end of packet field each can be one byte long. The data field can be 32 bytes long. The error checking field can be two bytes long. The end of packet field can contain an indication of how many of the 32 bytes in the data field are filler bytes. The synchronization field can contain a predetermined shift-invariant value. The response field can include flow-control information, and the flow-control information can include flow-control information for multiple channels. The header field can include a channel-selection subfield indicating a channel that the data packet is intended for. The header field can include a command subfield, and the command subfield can include a synchronization command.

In another aspect, a method and computer program product are provided that include receiving at a first node an acknowledgement field in a first data packet from a second node. In response to the receipt of the acknowledgement field, two or more data packets previously transmitted from the first node are retransmitted only if the acknowledgement field in the first data packet is a no acknowledgement (NAK). If, instead, the acknowledgement field is an acknowledgement (ACK), a second data packet is transmitted from the first node to the second node, and the first data packet is checked for errors after beginning transmission of the second data packet. If errors are detected in the first data packet, a NAK is transmitted from the first node to the second node substantially immediately after completing the transmission of the second data packet. If no errors are detected in the first data packet, a third data packet is transmitted from the first node to the second node substantially immediately after completing the transmission of the second data packet.

In yet another aspect, a method and computer program product are provided that include receiving at a first node a first data packet transmitted from a second node. The first data packet includes a fault signal. The first node is placed into a safe state in response to the fault signal, and a second data packet including the fault signal is transmitted from the first node to a third node before processing, at the first node, information included in a data field of the first data packet. Particular implementations may include receiving at the first node a third data packet transmitted from the second node, where the third data packet does not include the fault signal, and the first node is in the safe state. The first node is placed into an operational state, and a fourth packet is transmitted from the first node to the third node, where the fourth packet does not include the fault signal.

Particular embodiments can be implemented to realize one or more of the following advantages. A transmitter and a receiver can be synchronized very precisely (e.g., to within substantially 10 microseconds or less). Latency can be bounded and kept low (e.g., less than substantially 10 microseconds). Data can be transmitted with low latency over a single physical path connector. A same communication protocol can be used for multiple communication links operating at different speeds in a single system. The communication protocol can be implemented inexpensively in hardware. Bandwidth can be used for data transmission that otherwise would be used waiting for an acknowledgement. Error detection and recovery can be performed on flow control information and acknowledgement information at the same time. Fault information can be transmitted throughout a system rapidly. Multiple independent streams of data at different priority levels can be transmitted throughout the system.

These general and specific aspects may be implemented using a method, an apparatus, a system, or any combination of methods, apparatus, and systems.

The details of one or more embodiments of the invention are set forth in the accompanying drawings and the description below. Other features, aspects, and advantages of the invention will become apparent from the description, the drawings, and the claims.

DETAILED DESCRIPTION

A link layer is described that uses a substantially continuous stream of full-duplex serial data between two system nodes. Nodes can include, for example, computers, programmable processors, field-programmable gate arrays (FPGAs), or other data processing apparatus. The data is divided into fixed-length packets. Each fixed-length packet can contain data, error-checking information, flow control information, diagnostic information, fault information, and retransmission control information. The data in each packet can include hardware-level data or portions of messages (e.g., software messages).

The fixed-length packets are continuously transmitted between two nodes, regardless of whether data is available to transmit. When no data is available to transmit, the data field of a packet can be filled with "filler" data that can be discarded at the receiving node. The transmitted packets include acknowledgements of previously received packets, and a transmitting node will transmit a first packet and begin transmitting at least one subsequent packet before receiving an acknowledgement of the first packet from the receiving node. The transmission and receipt of packets at a node are interlocked, as will be described in more detail below.

Figure 1:
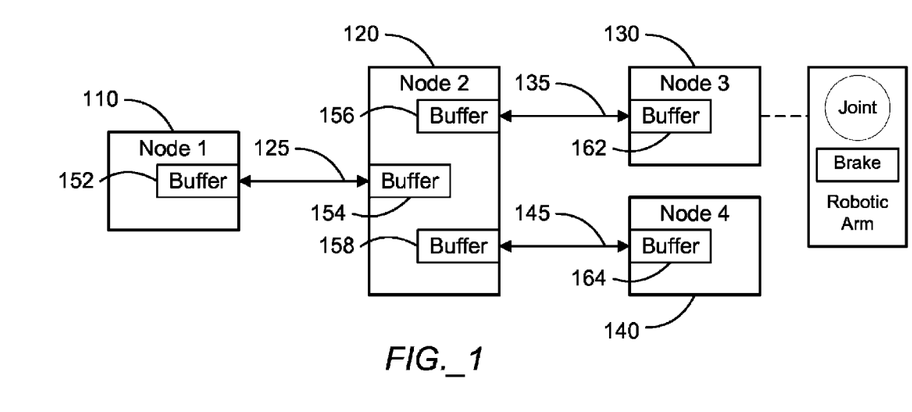
FIG. 1 is a block diagram of a system that includes multiple nodes connected by links.

As shown in FIG. 1, data from a first node 110 can be transmitted to multiple destination nodes—for example, a second node 120, a third node 130, and a fourth node 140—by multiplexing the data on a link. Nodes between the first node 110 and a particular destination node can route the data. The first node 110 can transmit data for the second node 120 over a first link 125. The first node 110 also can transmit data for the third node 130 over the first link 125 to the second node 120, and the second node 120 can route the data to the third node 130 over a second link 135. Likewise, the first node 110 can transmit data for the fourth node 140 over the first link 125, and the second node 120 can route the data to the fourth node 140 over a third link 145.

The designation of a destination node can be handled, in one implementation, in a message that is included in the data being transmitted. In this implementation, the second node 120 typically processes at least part of a message being sent from the first node 110 before sending packets containing portions of the message to the destination node. If the second node 120 is itself the destination node, the message need not be transmitted any further.

In some systems, communications occur more frequently between the first node 110 and the third node 130 and the fourth node 140 than communications between the third node 130 and the fourth node 140 occur. In such systems, the first link 125 can be a higher-speed link than the second link 135 or the third link 145 to provide sufficient capacity for the greater volume of data that passes over the first link 125.

The nodes 110, 120, 130, and 140 can include one or more hardware data buffers 152-164 that receive messages and hold the messages until software executing on the respective node or on a data processing apparatus in communication with the respective node is ready to receive the messages.

Figure 2:
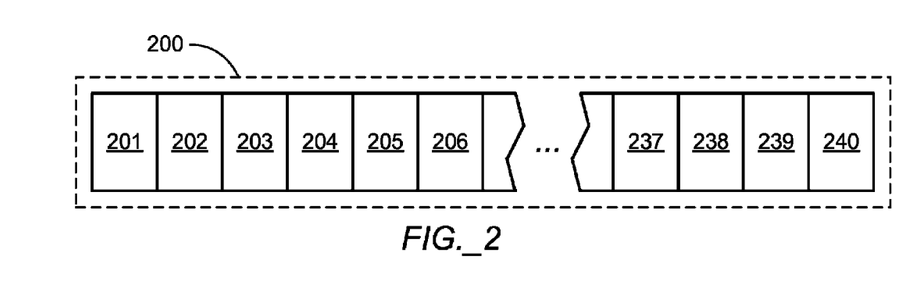
FIG. 2 is a diagram of the structure of a data packet.

As shown in FIG. 2, a fixed-length packet 200 of one implementation can include multiple bytes 201-240. While a 40-byte packet is shown, the fixed-length packet can be other lengths. In the implementation shown, control information is placed in 8 of the 40 bytes, and data is placed in the remaining 32 bytes. The first byte 201 is a synchronization field that can be used to maintain byte framing at a node that receives the packets. An additional synchronization byte can periodically be added to a packet (e.g., once every 128 packets) to compensate for clock drift between nodes. The second byte 202 is an acknowledgement field that indicates whether the last packet received by the node transmitting packet 200 was received correctly (e.g., included valid error-checking information). The second byte 202 can be set to one value (e.g., OxAC) to indicate an acknowledgement (ACK) that the last packet was received correctly and to the inverse value (e.g., 0x53) to indicate that the last packet was not received correctly (no acknowledgement, or NAK). In one implementation, any value other than the acknowledgement value can be interpreted as no acknowledgement. In this implementation, if the NAK value is the inverse of the ACK value, an 8-bit error is required to transform a transmitted NAK into an ACK.

The third byte 203 is a response field that contains multiple control bits, such as a test-mode bit that indicates the system is in a diagnostic test mode and an XOFF bit for each of multiple message channels (e.g., low-, medium-, and high-priority channels). The control bits can also include a retransmission bit that when set indicates that the packet 200 is a retransmission of an earlier packet. One or more of the control bits also can be fault bits, which indicate that an error has occurred in the system.

The fourth byte 204 is a header field. The header field can include multiple subfields, such as a channel-select subfield and a command subfield. The channel-select subfield is used to indicate on which priority channel the data in the packet 200 is being transmitted. The command subfield can include instructions to flush buffers and restart a message stream. The command subfield can include instructions requesting that particular data be sent over the hardware channel or codes to identify such data. The command subfield also can be used to synchronize the system. For example, at the beginning of a synchronization cycle, a packet that contains the synchronization command can be sent, enabling subsystems within the system maintain synchronization (e.g., to within 10 microseconds). The fifth byte 205 is a sequence number field that contains a sequence number that can be used by a receiving node to detect transmission errors. The sixth byte 206 through the $37^{th}$ byte 237 belong to a data field that holds 32 bytes of data, such as a message or portion of a message.

The $38^{th}$ byte 238 is an end-of-packet field that can specify how many of the bytes in the data field correspond to a message and how many bytes are filler bytes. The end-of-packet field also can include an end-of-message indicator bit that is set when the bytes in the data field end a message. The end-of-message indicator bit can trigger an interrupt at the receiving node. The $39^{th}$ byte 239 and $40^{th}$ byte 240 are part of an error-checking field that can contain, in one implementation, a 16-bit CRC value (e.g., computed using the CCITT 16-bit CRC algorithm). When a node receives a packet, the node can use the error-checking field to determine whether an error occurred while the packet was being transmitted or received.

The structure of the packet 200 allows fault reaction logic (FRL) signals that indicate a fault in a node to be communicated in multiple ways. For example, FRL signals can be transmitted in packet control information (e.g., in the control bits of the response field of packet 200), and/or in messages. Transmitting FRL signals directly in packet control information allows fault information to be transmitted very quickly system wide and to be handled at a very low level. A system-wide fault signal can be propagated without software intervention, and fault reaction hardware can put the system in a safe state when a fault signal is received. Once the problem that caused the fault has been solved (e.g., by the intervention of a human operator), the fault signal can be cleared and the system can return to an operational state. When the fault signal is cleared, the FRL signal indicating a fault typically is not transmitted in the packet control information until another fault occurs.

An example of a system in which the quick propagation of a fault signal is beneficial is a robotic surgery system. Such a system can include multiple robotic arms that hold surgical instruments or devices (e.g., laparoscopes, endoscopes, lights, cameras, and insufflators), some of which may be inside a patient. The robotic arms typically are manipulated remotely by a surgeon. Communications between controls that the surgeon operates and the nodes that control the robotic arms can use the methods, systems, and apparatus described in the current disclosure. If a fault occurs in such a system, the robotic arms can be locked in place so that the patient is not injured by unintended movements of the robotic arms. When the system fault occurs and a system fault is propagated between nodes, brakes can be applied to the joints of the robotic arms and communication of movement commands can be suspended until the fault is cleared by a human operator or automatically by a system monitoring unit.

The described packet structure allows data such as messages to be sent on a single channel or on multiple channels that are multiplexed on a serial connection. The channel on which a particular message is being sent is indicated by the channel select subfield in the packet 200. The system software can place messages in different hardware buffers for each channel (e.g., using different addresses), and the system hardware automatically assigns a message to a channel based on which buffer the message was placed into. The multiple channels can be assigned different priority levels. In one implementation, when messages of differing priorities are waiting to be transmitted, a packet or group of packets containing data being transmitted on a high-priority channel is transmitted before a packet or group of packets containing data being transmitted on a low-priority channel. In another implementation, packets containing data being transmitted on a high-priority channel are allocated more transmit slots than packets containing data being transmitted on a low-priority channel. Time-critical messages can be transmitted on the high-priority channel, while relatively unimportant messages can be transmitted on the low-priority channel. The system hardware can automatically transmit a portion of a message once enough data is written into a buffer to fill a packet. That is, message transmission can be performed as data becomes available and need not wait until an entire message is written into the buffer.

The XOFF bits in the third byte 203 control the flow of data in the channels. Each node can include multiple hardware buffers that receive messages transmitted on a respective one of the multiple channels. For example, high-priority messages are stored in a high-priority buffer and low-priority messages are stored in a low-priority buffer. When a first node that transmits the packet 200 sets an XOFF bit in the packet 200, the first node is instructing a second node that receives the packet 200 to stop transmitting data to the first node on the respective data channel. The first node's hardware can automatically set an XOFF bit for a data channel, for example, when a buffer into which the first node places messages from that data channel is becoming full. In one implementation, a threshold for when a node sets the XOFF bit for a given channel is set equal to the size of the respective channel's receive buffer in the node (e.g., 512 words) minus 32 words (4 packets). The 32-word margin gives the receiving node time to receive and act on the XOFF signal with a margin for error. Other threshold levels are possible. The first node's hardware also can set the XOFF bit for the data channel when a large number (e.g., 12) of messages are in the receive buffer. The hardware can automatically clear the XOFF bit for the data channel once packets or messages are removed from the buffer. Each priority channel can have a respective receive buffer in a node. Because the XOFF bits are transmitted in every packet, the error-checking field applies to the XOFF bits and guards against corruption of the XOFF bits.

Multiple channels of communication can be made available in the link layer using the channel-select subfield described above. For example, a hardware channel and high-, medium-, and low-priority channels can be implemented. Messages can vary in length (e.g., between 3 and 128 words) and can be transmitted in one or more packets, depending on the length of the message. The first byte of a message can contain the address of a destination node for the message. System hardware can fragment messages into multiple packets at a transmitting node and defragment the messages at a receiving node. If a message does not fill the data portion of a packet, filler data can be inserted into the remainder of the data portion. Transmit and receive buffers for the messages can be implemented in hardware. For example, a node can include hardware transmit and receive buffers for each channel (e.g., high-, medium-, and low-priority channels). In one implementation, transmit and receive buffers for the channels are 1.5 times a maximum message size.

Figure 3:
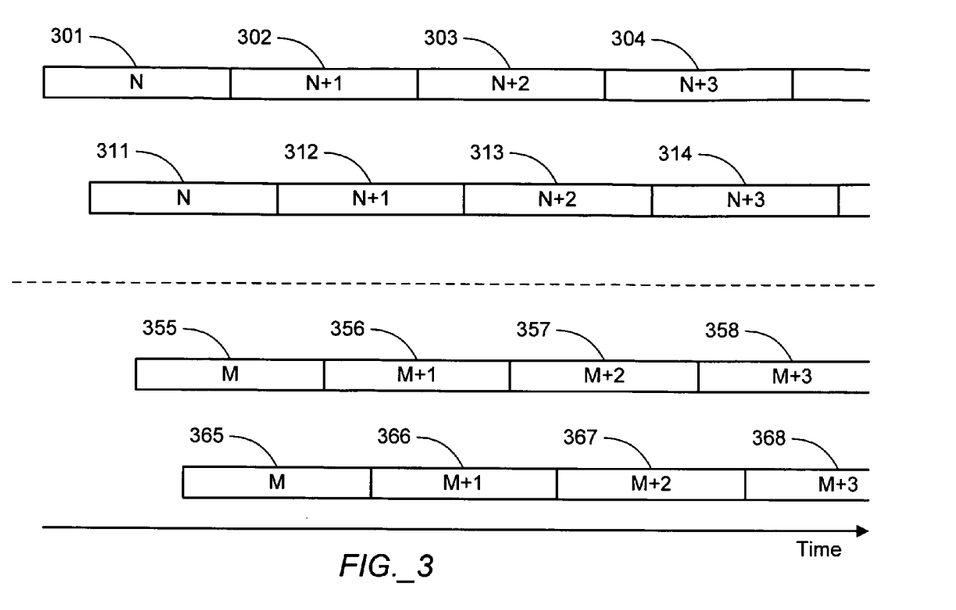
FIG. 3 is a timing diagram of packet transmission between nodes.

FIG. 3 shows a conceptual timing diagram for communication between two nodes using packets such as those discussed in the context of FIG. 2. Packets 301-304 are transmitted sequentially from a primary node to a secondary node. Packets 311-314 are received at the secondary node and correspond to the packets 301-304, although the packets 311-314 may be corrupted versions of the respective packets 301-304 if transmission errors occurred. The receipt of the packets 311-314 is delayed in time relative to the transmission of the packets 301-304 because of the finite propagation time of the packet along a link. In the example shown in FIG. 3, the propagation time of the packet is less than the duration of the packet (the amount of time required by the primary node to transmit the packet).

The secondary node transmits packets 355-358 to the primary node. Packets 365-368 are received at the primary node after a delay and correspond to the packets 355-358. The Packet 356 includes an acknowledgement field that applies to the packet 301. If the packet 311 (which corresponds to packet 301) was received correctly at the secondary node, the packet 356 includes an ACK for packet 301. If the packet 311 was not received correctly, the packet 356 includes a NAK. The packet 357 includes an acknowledgement field corresponding to the packet 302. Similarly, the packet 303 includes an acknowledgement field that indicates whether or not the packet 365 was received correctly at the primary node, and the packet 304 includes an acknowledgement field for the packet 366.

In one implementation, the secondary node does not begin transmitting packets until a first acknowledgement field is received from the primary node. For example, the secondary node does not begin transmitting the packet 355 until the secondary node receives the acknowledgement field in the packet 311. To facilitate initial synchronization between the primary and secondary nodes, the two nodes can transmit several sequential synchronization bytes to each other before the primary node transmits the packet 301.

FIG. 3 illustrates a case in which there is a two-packet "pipeline" between the primary and secondary nodes. The packet 356 contains an acknowledgement field for the packet 301. If the acknowledgement field contains an ACK, the primary node transmits the packet 303. If, however, the acknowledgement field of the packet 356 contains a NAK, the primary node can reframe and retransmit the packets 301 and 302. In this implementation, two packets are retransmitted when a NAK is received for the first of the two packets in order to resynchronize the system. If the first of the two packets was not received correctly, the second packet can be retransmitted without checking whether the second packet was received correctly the first time it was transmitted. In a situation where the error in the first packet was caused by loss of synchronization between the two nodes, the second packet would likely contain errors, so the second packet is retransmitted preemptively. The node that transmitted the NAK also will retransmit the last two packets that it transmitted before transmitting the NAK. FIG. 3 is described as having a two-packet pipeline between the primary and secondary nodes because an acknowledgement field is received for a given packet only after another packet has been transmitted. The round-trip time between the primary and secondary nodes is equal to or slightly less than the time required to transmit one packet—that is, the primary node will begin receiving the packet 365 before the primary node has finished transmitting the packet 301. The round-trip time typically depends on the propagation delay over a link and the processing time at a node. Longer round-trip times (longer in absolute time or in time relative to the packet duration) also can be used in a system and can result in a pipeline that is deeper than two packets.

Packets are transmitted substantially continuously between the primary and secondary nodes, regardless of whether there are messages to place in the data fields of the packets. The packets are transmitted in an interlocked manner, as shown in FIG. 3. The interlocked transmission of fixed-length packets causes a fixed phase offset between the packets received at a node and the packets transmitted by the node. The node receives a packet from a remote node that contains an acknowledgement of error-free receipt of a previously transmitted packet a predetermined amount of time after the transmission of the previously transmitted packet. The continuous transmission of interlocked packets allows for high-bandwidth, low-latency communications with precise synchronization between nodes. In addition, the continuous transmission of packets allows the system to calculate the bit error rate (BER) of a connection between nodes accurately and substantially continuously.

Figure 4:
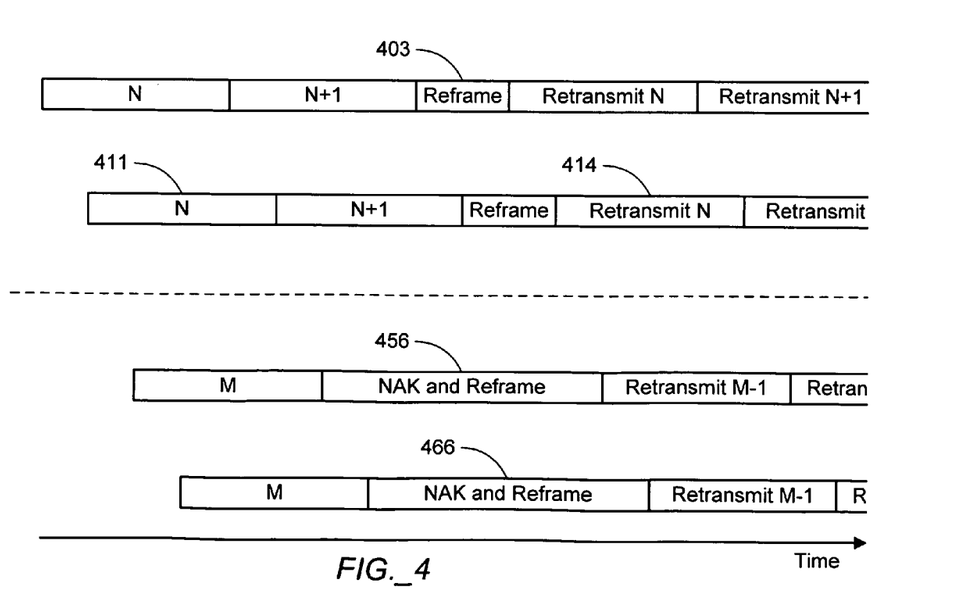
FIG. 4 is a timing diagram of an error recovery scenario.

As shown in FIG. 4, when the secondary node receives a packet 411 from the primary node and determines that a transmission error occurred that caused the data in the packet 411 to become corrupted, the secondary node finishes transmitting a packet and, instead of transmitting a next packet, transmits a NAK and reframing sequence 456 to the primary node. The refraining sequence 456 is transmitted to reestablish synchronization between the primary and secondary nodes, because one reason that the packet 411 may have been corrupted is that synchronization between the primary and secondary may have been diminished or lost. The reframing sequence can consist of alternating synchronization fields and link fields, where the link field can be a predetermined code such as 0xA3. In one implementation, four link bytes must be received before a node is considered reframed. The primary node receives a NAK and reframing sequence 466 and transmits a reframing sequence 403. After the primary node has transmitted the reframing sequence 403, the primary node resends the last packets that were transmitted before receiving the NAK. In the case of an N-packet pipeline, the last N packets are resent. Once the secondary node receives an ACK in a first retransmitted packet 414, the secondary node also begins retransmitting packets.

Figure 5:
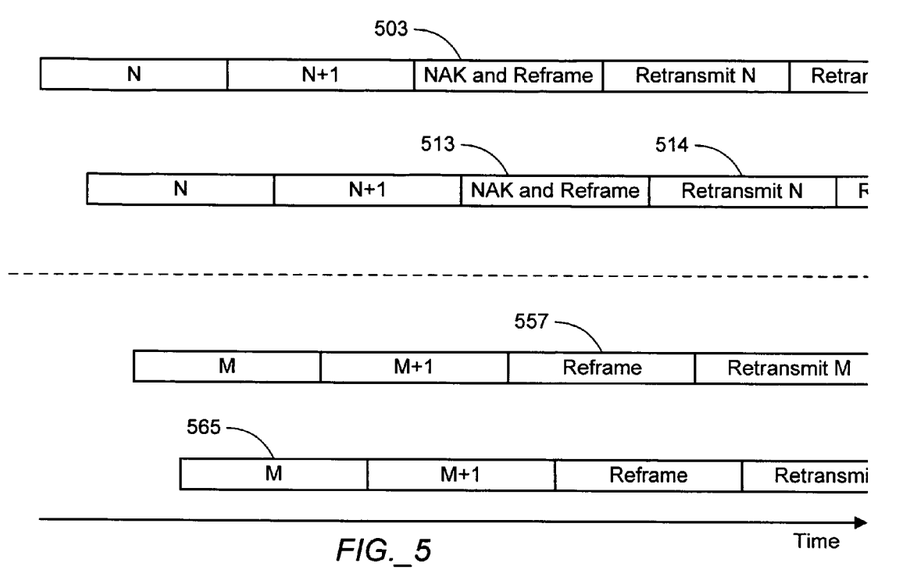
FIG. 5 is a timing diagram of an error recovery scenario.

As shown in FIG. 5, when the primary node receives a packet 565 from the secondary node and determines that a transmission error occurred that caused the data in the packet 565 to become corrupted, the primary node sends a NAK and reframing sequence 503 to the secondary node. The secondary node receives a NAK and reframing sequence 513 and sends a reframing sequence 557. After the primary node has transmitted the NAK and reframing sequence 503, the primary node resends the last packets that were transmitted before receiving the corrupted packet. Once the secondary node receives an ACK in a first retransmitted packet 514, the secondary node also begins retransmitting packets.

An error counter can keep track of the number of hardware transmission errors that occur in a node. An interrupt can be enabled when the counter reaches a threshold. In one implementation, the error counter can be read by software in the node, and the software can set the interrupt threshold. Error detection and correction can be handled at a very low level in this system, and a software layer operating on top of the described link layer need not implement additional error detection and correction.

Figure 6:
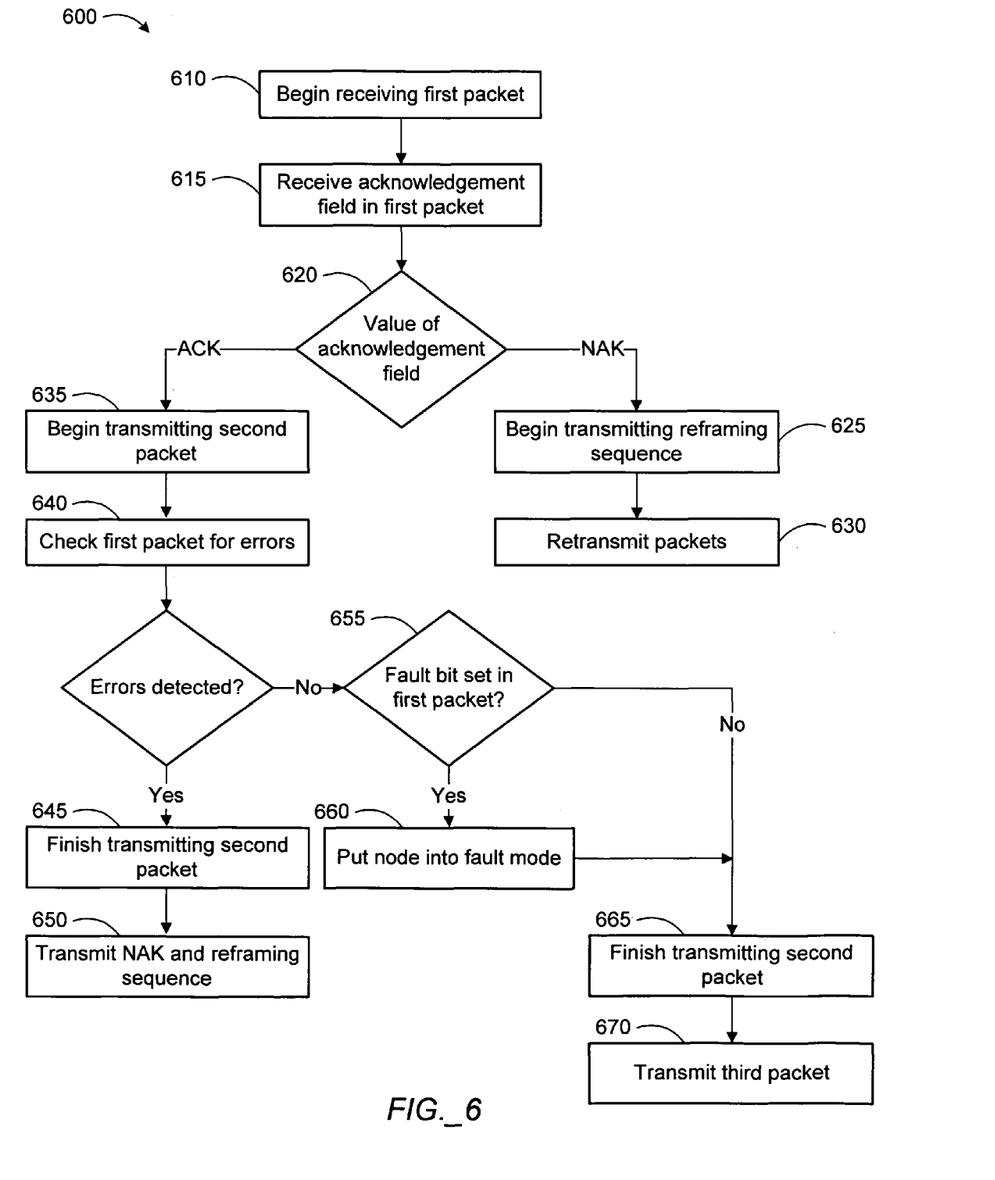
FIG. 6 is a flowchart of a process performed at a node.

FIG. 6 illustrates a process 600 performed at a node in one implementation. The node begins receiving a first packet (step 610) and receives an acknowledgement field in the first packet (step 615). The node determines whether the acknowledgement field is an ACK or a NAK (step 620). If the acknowledgement field is a NAK, the node transmits a refraining sequence (step 625) and retransmits the packet that the received NAK corresponded to along with any packets that were transmitted after that packet (step 630). If the acknowledgement field is an ACK, the node begins transmitting a second packet (step 635) and checks the first packet for errors (step 640), for example, by verifying a CRC value in the packet. If errors were detected in the first packet, the node finishes transmitting the second packet (step 645) and transmits a NAK and reframing sequence (step 650).

If no errors were detected in the first packet, the node determines whether a fault bit was set in the first packet (step 655). If a fault bit was set, the node is put into a fault mode or safe state (step 660). If the fault bit was not set, or once the node is put into a fault mode, the node finishes transmitting the second packet (step 665) and begins transmitting a third packet (step 670).

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. The methods, systems, and apparatus described above can be used with various physical transport mechanisms, including fiber optics (e.g., operating at 160 Mb/sec), low-voltage differential signaling (e.g., operating at 122 Mb/sec), source synchronous serial, and asynchronous backplane wires. In one implementation, corrupt packets need not be retransmitted when the packets contain data that can tolerate errors. For example, occasional glitches in a video or audio stream are acceptable. Error detection and reframing can still be used in this implementation to allow fast hardware-implemented recovery from framing errors.

What is claimed is:

1. A robotic surgical system comprising:
    a first node configured to generate and transmit a data packet comprising control information and message information, wherein the control information comprises a fault bit that is set by the first node and that indicates a system fault condition exists;
    a second node configured to receive and retransmit the transmitted data packet without software intervention;
    a third node configured to receive the retransmitted data packet from the second node;
    a first robotic arm joint;
    a second robotic arm joint; and
    fault reaction hardware;
    wherein the fault reaction hardware is configured to place the system in a safe state that includes locking a position of the first robotic arm joint as a result of the second node receiving the transmitted data packet and detecting the set fault bit; and wherein the fault reaction hardware is configured to place the system in a safe state that includes locking a position of the second robotic arm joint as a result of the third node receiving the retransmitted data packet from the second node and detecting the set fault bit.

2. The system of claim 1, wherein the data packet includes a synchronization field containing a predetermined shift-invariant value.

3. The system of claim 1, wherein:
the data packet includes a response field containing flow-control information.

4. The data packet of claim 3, wherein:
the flow-control information includes flow-control information for multiple channels, each channel having a particular message priority.

5. The data packet of claim 1, wherein:
the data packet includes a header field including a channel-selection subfield indicating a channel that the data packet is intended for, where each channel has a particular assigned priority.

6. The system of claim 1, wherein:
the data packet includes a header field including a command subfield.

7. The system of claim 6, wherein:
the command subfield of the data packet includes a synchronization command.

8. The robotic surgical system of claim 1, further comprising:
a fourth node configured to receive the retransmitted data packet from the second node, wherein upon receiving the retransmitted data packet and detecting the set fault bit at the fourth node, the fault reaction hardware places the system in a safe state that includes locking a position of a third robotic arm joint.

9. The system of claim 1, further comprising:
a robotic arm, wherein the robotic arm comprises the first robotic arm joint and the second robotic arm joint.

10. The system of claim 1, further comprising:
a first robotic arm, wherein the first robotic arm comprises the first robotic arm joint; and
a second robotic arm, wherein the second robotic arm comprises the second robotic arm joint.

11. A method comprising:
detecting a fault in a robotic surgical system;
in response to detecting the fault, generating and transmitting a data packet at a first node, the data packet comprising control information and message information, wherein the control information comprises a fault bit that is set by the first node and that indicates a system fault condition exists;
receiving the transmitted packet at a second node, the second node operable to receive and retransmit the transmitted data packet without software intervention;
detecting the fault bit is set in the received data packet at the second node;
locking a position of a first joint of one or more robotic arms of the robotic surgical system, the first joint being associated with the second node;
receiving the retransmitted data packet at a third node, the third node operable to receive the retransmitted data packet from the second node;
detecting the fault bit is set in the received data packet at the third node; and
locking a position of a second joint of the one or more robotic arms of the robotic surgical system, the second joint being associated with the third node.

12. The method of claim 11, further comprising:
propagating the data packet including the fault information to a plurality of nodes, each node operable to receive and retransmit the data packet; and
clearing the fault bit in the data packet when the fault is corrected.

13. A robotic surgical system comprising:
a plurality of nodes configured to receive a transmitted data packet comprising control information and message information, wherein the control information comprises a fault bit that, when set, indicates a system fault condition exists in the robotic surgical system;
a first robotic arm joint;
a second robotic arm joint; and
fault reaction hardware;
wherein each node of the plurality of nodes is configured to receive and retransmit the transmitted data packet without software intervention; and
wherein the fault reaction hardware is configured to place the robotic surgical system in a safe state that includes locking a position of the first joint as a result of the first node receiving the data packet and detecting the fault bit as set and locking a position of the second joint as a result of a second node receiving the data packet from the first node and detecting the fault bit as set.

14. The system of claim 13, further comprising:
a robotic arm, wherein the robotic arm comprises the first robotic arm joint and the second robotic arm joint.

15. The system of claim 13, further comprising:
a first robotic arm, wherein the first robotic arm comprises the first robotic arm joint; and
a second robotic arm, wherein the second robotic arm comprises the second robotic arm joint.

16. A method comprising:
detecting in control information of a data packet received at a first node that a fault bit is set to indicate that a robotic surgical system fault exists, the data packet further comprising message information;
locking a position of a first joint in one or more robotic arms in the robotic surgical system in response to detecting at the first node that the fault bit is set;
retransmitting the data packet from the first node to a second node;
detecting that the fault bit is set in the retransmitted data packet received at the second node; and
locking a position of a second joint in one or more robotic arms in the robotic surgical system in response to detecting at the second node that the fault bit is set.

* * * * *